(12) United States Patent
Vantalon et al.

(10) Patent No.: US 9,819,972 B1
(45) Date of Patent: *Nov. 14, 2017

(54) METHODS AND APPARATUSES FOR A DISTRIBUTED LIVE-ON-DEMAND (LOD) ORIGIN

(71) Applicant: Digital Keystone, Inc., Cupertino, CA (US)

(72) Inventors: Luc Vantalon, Sunnyvale, CA (US); Paolo Siccardo, Los Altos, CA (US)

(73) Assignee: Digital Keystone, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/961,848

(22) Filed: Dec. 7, 2015

Related U.S. Application Data

(60) Provisional application No. 62/090,285, filed on Dec. 10, 2014.

(51) Int. Cl.
| | |
|---|---|
| *H04N 21/231* | (2011.01) |
| *H04N 21/2187* | (2011.01) |
| *H04N 21/4147* | (2011.01) |
| *H04N 21/472* | (2011.01) |
| *H04N 21/845* | (2011.01) |
| *G11B 27/10* | (2006.01) |
| *H04N 21/458* | (2011.01) |
| *H04N 21/262* | (2011.01) |
| *H04N 21/84* | (2011.01) |
| *H04N 21/242* | (2011.01) |
| *H04N 21/43* | (2011.01) |
| *H04N 21/643* | (2011.01) |
| *H04N 21/4223* | (2011.01) |

(Continued)

(52) U.S. Cl.
CPC ....... *H04N 21/23113* (2013.01); *G11B 27/10* (2013.01); *H04N 7/18* (2013.01); *H04N 21/2187* (2013.01); *H04N 21/242* (2013.01); *H04N 21/262* (2013.01); *H04N 21/4147* (2013.01); *H04N 21/4223* (2013.01); *H04N 21/4302* (2013.01); *H04N 21/4331* (2013.01); *H04N 21/458* (2013.01); *H04N 21/47202* (2013.01); *H04N 21/643* (2013.01); *H04N 21/84* (2013.01); *H04N 21/8456* (2013.01)

(58) Field of Classification Search
CPC ......... H04N 21/23113; H04N 21/2187; H04N 21/4147; H04N 21/458; H04N 21/47202; H04N 21/84; H04N 21/8456
See application file for complete search history.

(56) References Cited

U.S. PATENT DOCUMENTS 6,591,058 B1 * 7/2003 O'Connor ............ G11B 27/034
386/248
7,143,433 B1 * 11/2006 Duan ............... H04N 21/23103
711/114

(Continued)

*Primary Examiner* — Pinkal R Chokshi
(74) *Attorney, Agent, or Firm* — Blakely, Sokoloff, Taylor & Zafman LLP

(57) ABSTRACT

A novel live on demand origin architecture in one embodiment can enable the provision, operation and management of massively scalable, highly efficient, high availability content access services that offer random access to linear feeds without playback restrictions, supporting live, near-live, catch-up, start-over and VOD access modes regardless of Origin, Network and Player limitations.

33 Claims, 10 Drawing Sheets

(51) Int. Cl.
*H04N 7/18* (2006.01)
*H04N 21/433* (2011.01)

(56) References Cited

U.S. PATENT DOCUMENTS

| | | | | |
|---|---|---|---|---|
| 8,996,436 B1* | 3/2015 | Ren | ................ | G06N 5/02 |
| | | | | 706/46 |
| 9,110,907 B2* | 8/2015 | Shazly | .............. | G06F 17/30091 |
| 2005/0097619 A1* | 5/2005 | Haddad | .............. | H04N 7/17336 |
| | | | | 725/115 |
| 2009/0300673 A1* | 12/2009 | Bachet | ............... | H04N 7/17318 |
| | | | | 725/31 |
| 2009/0313667 A1* | 12/2009 | Zhao | .................. | H04N 7/17318 |
| | | | | 725/93 |
| 2012/0174175 A1* | 7/2012 | Xu | ........................ | H04N 5/782 |
| | | | | 725/110 |
| 2013/0136144 A1* | 5/2013 | Hong | .................... | H04H 60/82 |
| | | | | 370/474 |
| 2013/0276048 A1* | 10/2013 | Krasic | ................ | H04N 21/2187 |
| | | | | 725/116 |
| 2013/0311670 A1* | 11/2013 | Tarbox | ............... | H04N 21/2387 |
| | | | | 709/231 |
| 2014/0072270 A1* | 3/2014 | Goldberg | ................. | H04N 9/87 |
| | | | | 386/223 |
| 2014/0109127 A1* | 4/2014 | Kalmanje | ........... | H04L 65/1083 |
| | | | | 725/25 |
| 2014/0219088 A1* | 8/2014 | Oyman | ........... | H04N 21/23439 |
| | | | | 370/231 |
| 2014/0380376 A1* | 12/2014 | Schmidt | .............. | H04L 65/4084 |
| | | | | 725/54 |
| 2015/0324379 A1* | 11/2015 | Danovitz | ........... | G06F 17/30109 |
| | | | | 707/825 |
| 2015/0334152 A1* | 11/2015 | Oyman | ............. | H04W 52/0251 |
| | | | | 709/219 |
| 2016/0073149 A1* | 3/2016 | Feng | .................. | H04N 21/2747 |
| | | | | 725/115 |

* cited by examiner

METHODS AND APPARATUSES FOR A DISTRIBUTED LIVE-ON-DEMAND (LOD) ORIGIN

CROSS-REFERENCE TO RELATED APPLICATIONS

The present application claims the benefit of U.S. provisional patent application No. 62/090,285, filed on Dec. 10, 2014, and this provisional application is incorporated by reference herein in its entirety, and this provisional application is assigned to the same assignee as the present patent application.

FIELD

At least some embodiments as described herein relate generally to the design and operation of a distributed repository of live media content for the purpose of further instant redistribution as on-demand assets.

COPYRIGHT NOTICE

The present description includes material protected by copyrights, such as illustrations of graphical user interface images. The owners of the copyrights, including the assignee, hereby reserve their rights, including copyright, in these materials. The copyright owner has no objection to the facsimile reproduction by anyone of the patent document or the patent disclosure, as it appears in the patent and trademark office file or records, but otherwise reserves all copyrights whatsoever. Copyright Digital Keystone, Inc. 2015.

BACKGROUND

The video distribution industry (broadcast TV stations and satellite, cable and Telco pay TV) has traditionally met subscriber demand by offering a combination of entertainment, sports, and news. The technology employed to distribute the content is actively transitioning from live broadcast to Internet IP-based streaming of video assets. This transition is relatively seamless for VOD content, but it can be difficult to deploy and to scale for distributing live events. New "over the top" TV services are largely confined to VOD content, with limited attempts to deliver live news, sports, and weather.

TV broadcast networks (CBS, ABC and others) are offering VOD content on-line, and some networks are beginning to deliver linear channels over IP. Such streaming content can be accessed for playback in real time or near-real time via a mobile app, a PC browser or TV-specific platforms such as Apple TV or Roku, but on-demand access to live assets is limited. Content access limitations include the cost and complexity of packaging live feeds into discrete on-demand events, the finite storage depth of the origin and encoding systems, and the finite buffering capability of the player devices. Often pausing a live IP feed is only possible for a short time, and playback from the beginning of a live event that started in the past is not possible or constrained.

Pay TV service providers (Comcast, Dish and others) are offering subscribers the ability to store and playback content from network-based devices (n-DVR, c-DVR). Such network devices are hosted in a public or private cloud and provide similar capabilities to an in-home DVR by copying each live event to a file. This approach brings many of the same restrictions of in-home DVR solutions. In some implementations the subscriber is required to set a recording time for an event, or else playback will not be available. Moreover, if the actual airtime of an event changes due to a change of schedule (such as is common for live sports) the recording will reflect the scheduled time and not the actual adjusted airtime, and complete playback of the event will not be possible.

Internet VOD services such as Netflix, Hulu, YouTube, iTunes and others deliver movies and TV series episodes over IP, by unicasting multiple VOD sessions originated from copies of a single video file using VOD origin servers. Some of the content can be recorded from live sources and re-purposed for VOD access, but this repurposing requires a complex, laborious and time-consuming conversion process that restricts content availability. As a result, VOD access to live recorded content is only available after a significant delay from the original content airtime.

Prior Art utilized by broadcast TV, Pay TV and Internet TV service providers includes the design and integration into service of a combination of VOD Origins, Linear Origins, File-based Time Shift Buffers (TSB), live encoders/packagers, just-in-time encoders/packagers, network digital video recorders (N-DVR), cloud-based digital video recorders (C-DVR), and various hardware and software systems attempting to implement catch-up TV services and start-over TV services, subject to various well-known limitations.

The prior art also includes distributed data storage and retrieval systems.

SUMMARY OF THE DESCRIPTION

The next step in IP distribution consists of offering scalable and unrestricted access to linear content. On-demand access to linear content allows the subscriber to catch up with live events (news, sports, weather), at any time, from the beginning. This "live on-demand" service requires the definition of a new architecture for a high performance, deep and highly scalable origin that delivers unrestricted access to linear content, regardless of original airtime and/or playback time constraints.

A Live-On-Demand (LOD) origin is radically different from a Video-On-Demand origin or a Linear Origin, as it should provide, in one embodiment, individualized playback modes for the same set of recorded content, based on each players' playback requirements, including the following:

Live and near-live access to live events. As an example, a LOD live session can be paused and later resumed after an arbitrary delay (1 minute or 1 week) regardless of the buffering capacity of the player device.

Open-ended on-demand access to any live event. As an example, a LOD live event can be played "from the beginning" regardless of the request time being very close or very far to the original airtime (start-over or "instant" VOD) immediately after original airtime, or at any point during the event, regardless of the buffering capacity of the player device.

Close-ended on-demand access to any past event, regardless of any pre-determined buffer capacity of the linear origin. As an example, a LOD system can be configured to "extend the useful life" of linear content to 1 day, 1 week, 1 month, 1 year or more after original airtime, regardless of the fixed buffer capacity of the player device.

Complete playback of any live event based on actual airtime, taking into account any airtime adjustments.

Complete playback of popular live events without the requirement to "pre-program" the recording of each event by each subscriber.

In order to provide these features, a LOD origin can capture a number of linear feeds, which don't necessarily have any pre-defined start or end times, and it can allow the service provider to define the desired useful life of the content (time-to-live or TTL). From each linear feed, a LOD origin can be capable of delivering live or near-live events, catch-up events that started in the past and will end in the future, and/or events that started and ended at anytime in the past, to players that have a limited buffering capacity.

A LOD origin should be capable of ingesting all the provisioned live streams, in real-time and without loss. This often requires the provision of redundant encoders and packagers, and the ingest process must be capable of properly synchronizing heterogeneous sources.

CDN implementations are often tuned for the delivery of close-ended long form events, and they can be incapable of efficiently delivering near-live streams. A LOD origin can provide hints the CDN for appropriate cache management of manifests and fragments.

Content availability is an essential requirement of a LOD origin. The implementation can be tolerant to any faults and provide all the system subscribers instant access to all its content, regardless of network, hardware and software status.

The implementation of LOD services for consumer access can require large amounts of processing, storage and network resources. A scalable architecture can be desirable for commercially viable deployments of LOD.

The provision of a massively scalable Live on Demand content from an always-available origin is addressed by this description of a LIVE ON DEMAND architecture. The LOD architecture provides innovative methods and apparatus for capturing, storing and delivering linear content that guarantee that the number of linear channels, the depth of the recordings, the state of the network and servers, and the traffic and diversity of the playback requests won't impact the performance and the outcome of a playback transaction.

The provision of unrestricted Live on Demand content, delivered from a very deep archive to players with constrained buffer capacity is addressed by this description. LOD can provide innovative methods and apparatus for calculating and synthesizing player-appropriate content playlists and delivering them to players (e.g., client devices) "on the fly". The format and structure of these playlists is client request-specific and this guarantees that the number of linear channels, the depth of their recordings, and the timing of each playback request relative to the original airtime won't impact the performance and the outcome of each transaction.

The embodiments described herein include methods for operating one or more live-on-demand (LOD) nodes, data processing systems that implement one or more LOD nodes, and non-transitory computer readable medium or media that store executable program instructions which when executed by a data processing system (such as one or more LOD nodes) cause the data processing system to perform one or more of the methods described herein.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF DRAWINGS

The embodiments as described herein are illustrated by way of example and not limitation in the figures of the accompanying drawings in which like references indicate similar elements.

DETAILED DESCRIPTION

The embodiments will be described with references to numerous details set forth below, and the accompanying drawings. The following description and drawings are illustrative of the embodiments and are not to be construed as limiting. Numerous specific details are described to provide a thorough understanding of the embodiments as described herein. However, in certain instances, well known or conventional details are not described in order to not unnecessarily obscure the embodiments in detail.

Reference throughout the specification to "at least some embodiments", "another embodiment", or "an embodiment" means that a particular feature, structure, or characteristic described in connection with the embodiment is included in at least some embodiments as described herein. Thus, the appearance of the phrases "in at least some embodiments" or "in an embodiment" in various places throughout the specification are not necessarily all referring to the same embodiment. Furthermore, the particular features, structures, or characteristics may be combined in any suitable manner in one or more embodiments.

Figure 1:
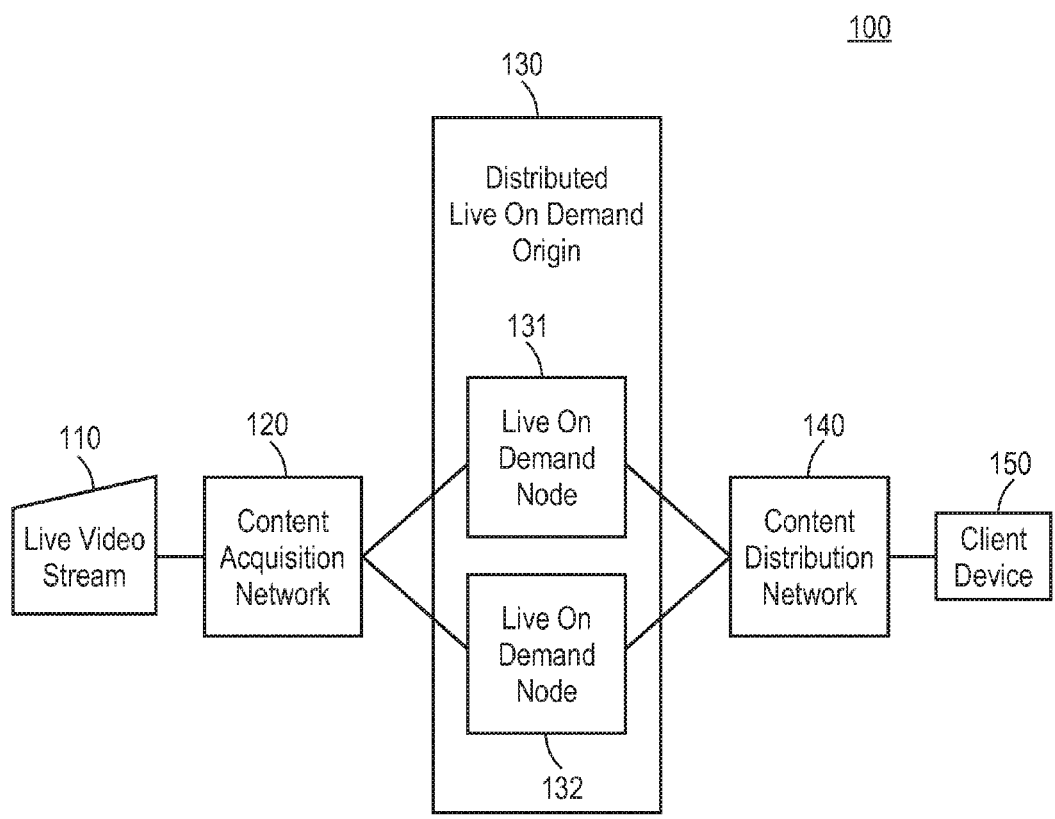
FIG. 1 shows a block diagram illustrating an exemplary embodiment of a distributed live-on-demand origin.

FIG. 1 shows a block diagram 100 illustrating an exemplary embodiment of a distributed live on-demand origin 130, ingesting content from one or more live video streams 110, through a content acquisition network 120, and delivering content intervals upon request to one or more client devices 150 through a content distribution network 140. An LOD node can be defined by way of an example. In one embodiment, an example of an LOD node is an LOD node that is a set of data processing systems, such as the LOD nodes shown in FIG. 8, and this set of systems can (1) receive a stream of content (e.g. a stream pursuant to the standard known as DASH MPEG ISO/IEC 23009-1) while the stream is being transmitted or broadcast to viewers at its regularly scheduled time and (2) while the stream is being transmitted or broadcast or after the stream has been initially transmitted or broadcast, allow client devices to retrieve the stream on demand (e.g. at any time after the LOD node has stored the stream) as long as the LOD node has not erased the stream at the LOD node.

Figure 9:
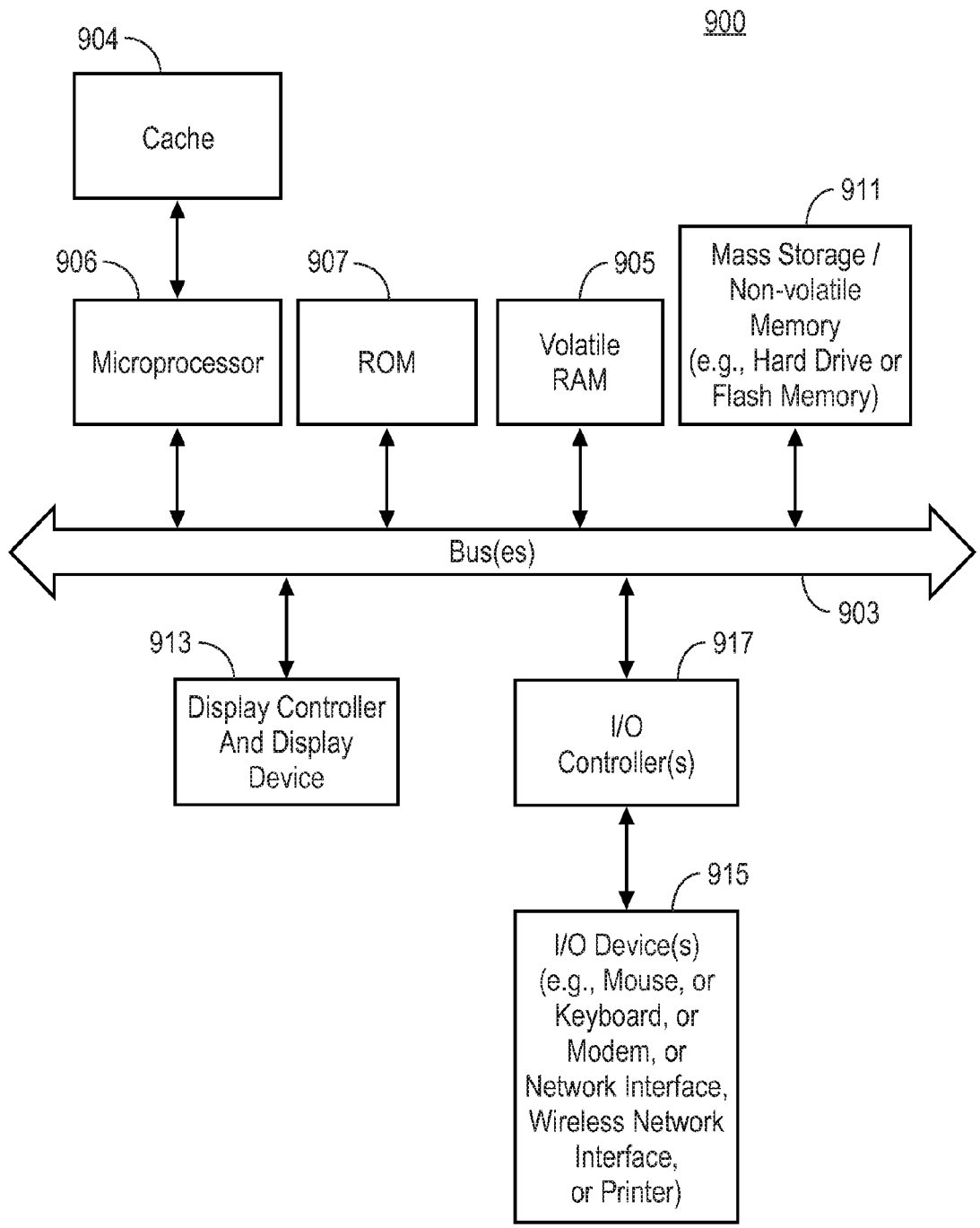
FIG. 9 shows an example of a hardware configuration of a data processing system that can be used as a LOD node.

In at least some embodiments, the distributed Live-On-Demand origin consists of a cluster of two live on demand nodes 131 and 132. Each LOD node can include memory (e.g. DRAM), one or more storage devices (e.g. hard drives or other storage devices), one or more buses coupling the memory and the storage devices to one or more processors that control the operation of the LOD node so that it operates as described herein. FIG. 9 shows an example of a LOD node. The invention does not limit the number of live on demand nodes, which could be topologically located in one or more datacenters.

In at least some embodiments, the Content Acquisition Network 120 consists of a network of audio/video transcoders and packagers nodes processing in real-time one or more live video streams 110, wherein the results of the processing consists of the last published segment files made available in one or more repositories directly addressable by the distributed Live-On-Demand origin, and wherein each segment files represents the captured live video streams for a finite interval of time at a given video or audio rate, and wherein all available segment files are described using a native transport protocol, such as, but not limited to, the HTTP Live Streaming (HLS) or the Dynamic Adaptive Streaming over HTTP (DASH) protocols (see, for example, ISO/IEC 23009-1). In some other embodiments, the segment file repositories are kept shallow by deleting every segment older than a few tens of seconds.

In one embodiment, the Content Acquisition Network 120 can include security cameras, surveillance cameras or similar audio/video capture devices that repeatedly and continuously capture images (and optionally sound) of a scene or set of scenes (such as a street or traffic intersection or one or more portions of a retail store or home, etc.). Each such camera can be coupled to one or more networks (e.g. the Internet) to deliver the captured images (and sound, if any) through the Content Acquisition Network 120 to one or more LOD nodes. These cameras can also timestamp (e.g. with a local wall clock time) each of the captured images with a time and a camera identifier that allows a user (at a client device 150) to retrieve a particular time interval from a particular camera by specifying the time interval (e.g. 5:00 pm to 6:00 pm on Dec. 1, 2015) and the particular camera (e.g. camera identifier 12345 which may be located at certain GPS coordinates and aimed in a given direction, which camera may be capturing images of the front door of a retail store). Thus, such a client device can retrieve images that were captured at one or more particular locations during a particular time interval by making a request (as described herein) for the recorded content (e.g. video of front door of a retail store and/or multiple views from cameral along a street) from one or more LOD nodes and play back the recorded content (received from the LOD node) at the client device. In this example, the time-to-live values for recorded images from the surveillance camera can be set based on the expected time when the playback may be needed (e.g. 1 day or a few days or several weeks). In one embodiment, the recorded content that needs to be preserved (such as a surveillance video of a robbery of a retail store) can be preserved by changing its time-to-live value; one way to change the time-to-live value in this case can be to "recycle" the selected recorded content through one or more LOD nodes by playing back the content from a LOD node and ingesting and store the played back content with a new (and larger) time-to-live value.

In at least some embodiments, the Content Distribution Network 140 consists of a network of caching servers, wherein each initial response to a client device request is locally cached for the duration instructed by the distributed live on demand origin, and wherein each successive client device request for the same data is served out of the local copy, as long as the local copy has not expired. The purpose of such Content Distribution Network is to protect the origin from redundant requests for the purpose of accelerating the simultaneous or nearly simultaneous distribution of video content to more client devices.

In at least some embodiments, a Client Device 150 is any device capable of rendering live video stream segment files, described using a transport protocol, such as, but not limited to, the HTTP Live Streaming (HLS) or the Dynamic Adaptive Streaming over HTTP (DASH) protocols.

In one embodiment, a Client Device 150 is, but is not limited to, a set-top box, a personal computer, a mobile phone, a smartphone, a game console or a tablet or other consumer electronic device.

Figure 2A:
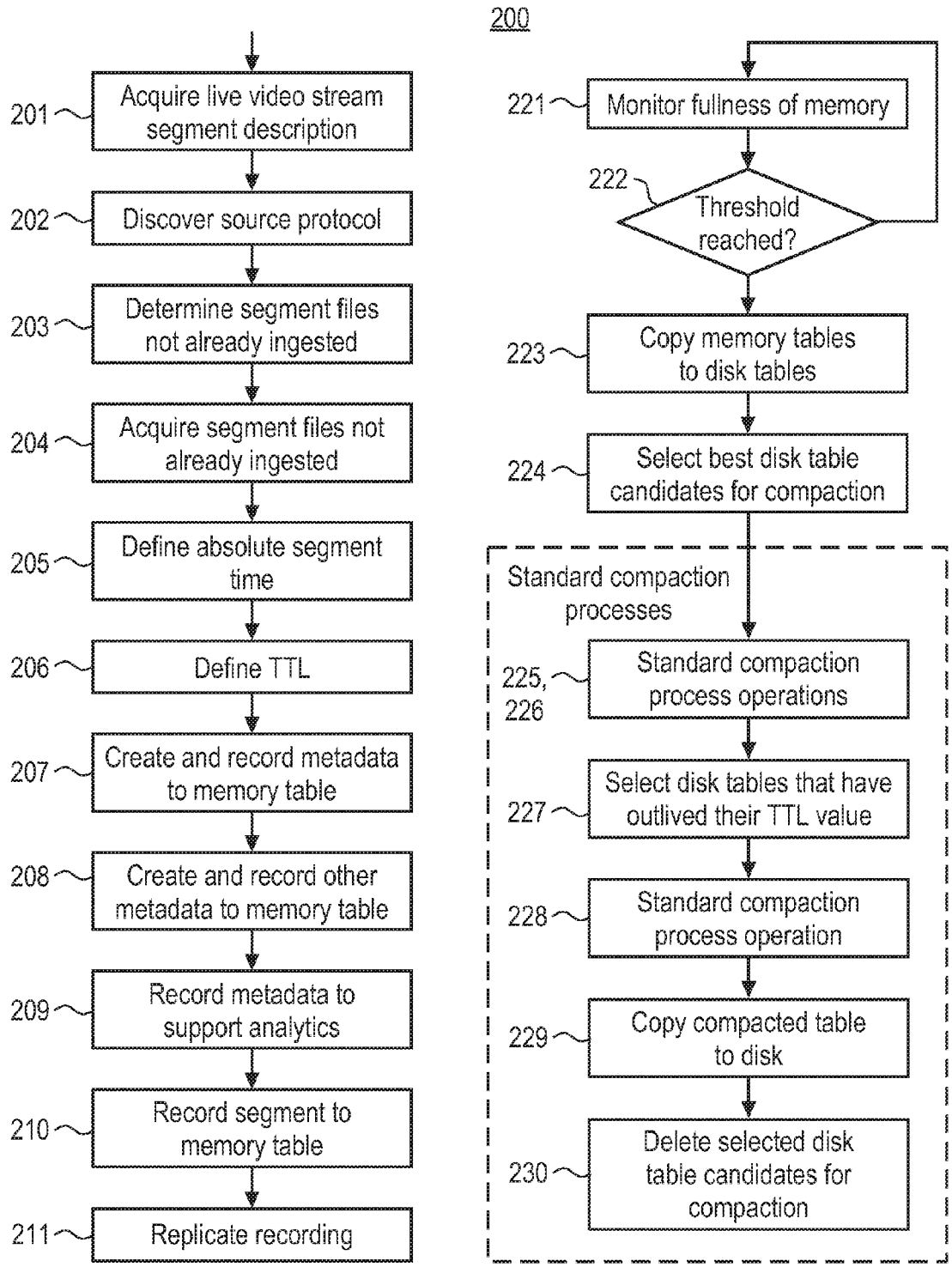
FIG. 2A shows a state diagram illustrating an exemplary embodiment for ingesting and recording new segment files and shows another state diagram which illustrates an exemplary embodiment for erasing selected old segment files.

FIG. 2A shows a state diagram 200 of a live on demand node 131, performing, according to one or more embodiments, the tasks of ingesting, recording and erasing a live video stream 110 out of a Content Acquisition Network 120. The elements of the state diagram 200 (and other state diagrams described herein) are referred to as operations, such as operation 201. The elements of state diagram 200 (and other state diagrams described herein) are shown in a particular sequence as part of a method performed by one or more LOD nodes according to one or more embodiments described herein. In other embodiments, one or more LOD nodes can perform a method with a different sequence of elements or with fewer or more elements.

In at least some embodiments, the live on demand node 131 acquires periodically, the description of the last segment files in operation 201, made available on the Content Acquisition Network 120 repository, and discovers the native source packaging protocol 202. In some other embodiment, the live on demand node determines which segment files have not been already ingested in operation 203 and acquires them in operation 204.

In at least some embodiments, the live on demand node 131 defines an absolute segment time for each segment file in operation 205. In some other embodiment, the segment time is calculated based on the wall clock of the first segment file recorded for the live video stream, and the successive durations of all the following ingested segments. In some other embodiment, wherein the previous segment files have been lost and the continuity with the original wall clock value cannot be enforced, a new wall clock value for the current segment is used instead.

In one embodiment, a time-to-live (TTL) value is associated to the ingested segment file in operation 206, wherein the TTL value, which defines from when a particular segment must stop being included into interval queries and can be erased, is function of the segment time, the wall clock time and a per-stream recording profile, and wherein, the wall clock time is used to select the applicable recording depth in the recording schedule of the recording profile and wherein the TTL value is equal to the recording depth added to the segment time.

In one embodiment, a form of metadata is created and recorded to a memory table in operation 207 with one or more searchable indexes, wherein the metadata represents an absolute segment context, based on the segment description of the sourced live video stream packaging protocol, to support the transmitting upon request of a random interval starting from the segment in the same streaming protocol.

In one embodiment, another form of metadata is created and recorded to a memory table in operation 208 with one or more searchable indexes, wherein the metadata represents one or more alternative segment contexts, based on the segment description of the sourced live video stream packaging protocol, to support the transmitting upon request of a random interval starting from the segment in one or more alternate streaming protocols.

In one embodiment, another form of metadata is created and recorded to a memory table in operation 209 with one or more searchable indexes wherein the represents multiple forms of performance details to support multi dimensional analytics queries.

In one embodiment, the recording of the segment file in operation 210 and its associated forms of metadata to memory tables is replicated (e.g. simultaneously or concurrently), in operation 211, on one or more live on demand node 131 for increased redundancy, wherein the live on demand nodes holding a replicates are topologically independent (i.e. different datacenters, racks). In some other embodiment, the choice of a set of live on demand nodes for storing a segment file or any of its multiple forms of metadata is specific to each object.

In at least some embodiments, a process 221 is monitoring the fullness of the memory dedicated to the storage of segment files and their form of metadata memory tables. When a threshold is reached (determined in operation 222), the memory tables are copied to disk in operation 223, and become disk tables.

In one embodiment, a process 224 to select the best disk table candidates for compaction, provides compaction parameters to a standard compaction process (which includes operations 225, 226, 227, 228, 229 and 230) which selects one or more disk tables that contain the most records that have potentially outlived their TTL value (determined in operation 227), iteratively copies the non-expiring data into a new table, and eventually deletes the original tables. The standard compaction process can be, in one embodiment, a compaction process performed by the Cassandra database application described herein, and the compaction parameters are defined in that process. In one embodiment the optimization of the compaction process is achieved by process 224 calculating compaction parameters such as the number of candidates tables and the minimum ratio of expired data, as a function of one or more average ingest rates, one or more average TTL values and the targeted disk overhead for the system, wherein the average ingest rate is calculated per node based on the total system ingest rate, the number of nodes and the replication factor, and is used to determine how often the compaction process is being triggered (higher ingest rates cause more frequent compaction processes, typically), and wherein the average TTL value is calculated per node, based on current TTL value of each individual live video stream weighted by the individual ingest rate, and wherein the calculated compaction parameters enable enough compaction events to occur within a time window defined as the average TTL value multiplied by the targeted disk overhead. For example, if a storage overhead of 20% is acceptable (in other words, a minimum level of 20% of the total disk space must remain free and available), the compaction parameters provided by process 224 will constrain the compaction process to include just enough disk tables to erase all obsolete content in 20% of the average TTL value or recording depth. One aspect of one embodiment of the invention is to continuously adjust the provided compaction parameters when any of the following conditions occurs: 1—when new live video channels are added or removed to and from the LOD origin, 2—when recording time-to-live values are evolving per each stream schedule, 3—when changes to the Content Acquisition Network affect the bandwidth of each ingested live video stream. Because the process of compaction requires writing to a new disk table at operation 229, while the disk tables that are candidate for compaction are still being stored (until eventually removed in operation 230), the compaction process inherently creates a disk overhead that could be fatal to the overall operation. For example, the erasing process could select two 100 GB candidate disk tables, which are filled at 50% with obsolete data, to be substituted upon completion of the erasing operation with a new 100 GB disk table. This erasing process will cause at step 229 a disk overshoot of 100 GB because at that stage both selected (200 GB) and new (100 GB) tables will be present. A distributed LOD system could manage thousands of channels that would need to be compacted in parallel, accumulating a large number of potential overshoots. One aspect of the invention is to sequence the compaction to minimize the accumulation of these overshoots, wherein the sequencing is achieved by grouping all the live video channel recordings, into one or more groups and using a statistically distributed variation of the provided compaction parameters for each group. As an example, if the minimum number of tables for compaction is calculated to be 30, the compaction process for each group will be provided by process 224 with a different value for this parameter in the range of 30+/−n % where n is a configurable dispersion value. As a consequence, each group will be compacted at a different time based upon its dispersed value.

In some other embodiment wherein the recording depth is very different from one subset of live video streams to another, the process of 224 is independently applied to each subset to minimize disk and CPU overhead.

In some other embodiment, the records from the selected disk table candidates that are not yet expired are aggregated into a new disk table, which once complete is copied to disk in operation 229.

In some other embodiment, the original selected disk table candidates are deleted from disk in operation 230.

Figure 2B:
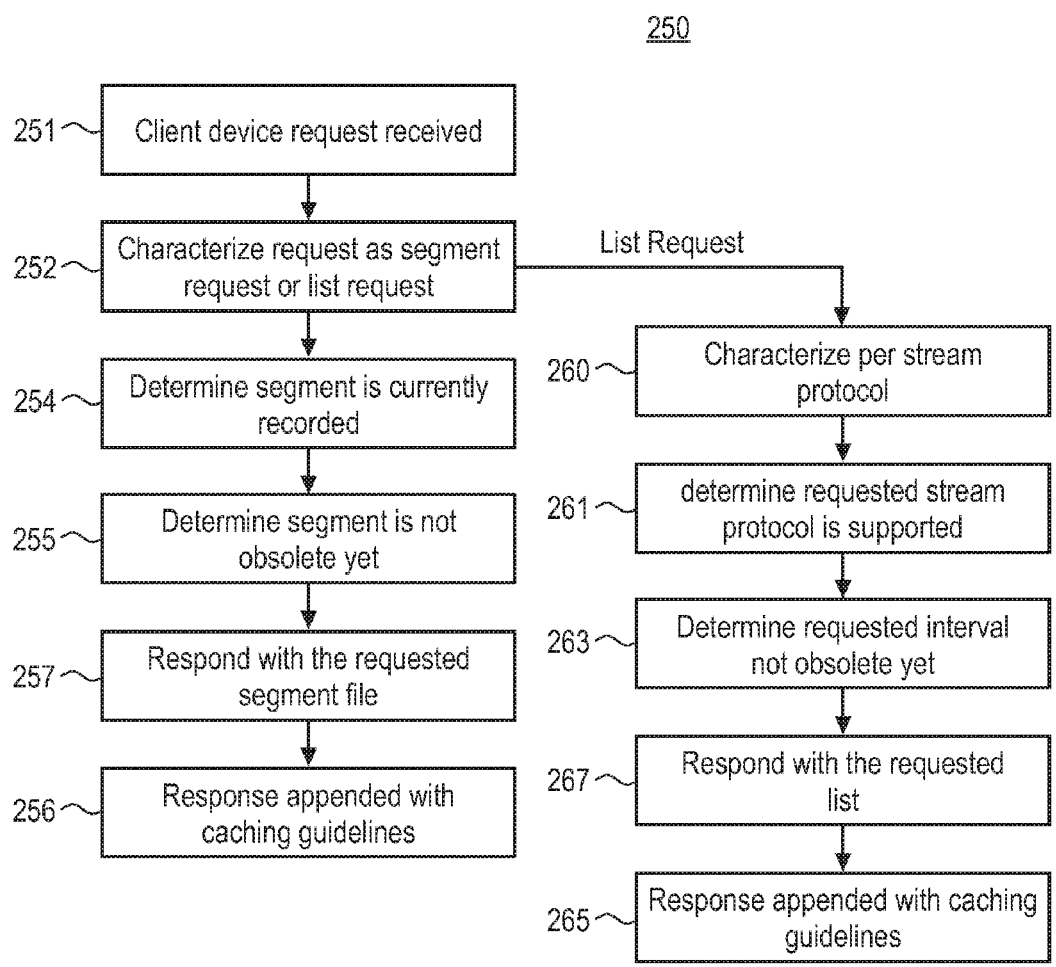
FIG. 2B shows a state diagram illustrating an exemplary embodiment for delivering upon request a list and description of all the segment files comprising a random interval or a segment file.

FIG. 2B shows a state diagram 250 of a live on demand node 131, performing the tasks of delivering through a Content Distribution Network 140, to one or more client devices 150 either a) a list and description of all the segment files comprising a random interval of one of the live video streams, or b) the segment files referenced in the transmitted list.

In at least some embodiments, the client device 131 request received in operation 251 is characterized in operation 252 as being a segment request or a list and description request, wherein a list and description request is further characterized per streaming protocol in operation 260.

In one embodiment, a segment request is responded, if the segment is currently recorded as determined in operation 254 and is not obsolete yet as determined in operation 255, with the requested segment file in operation 257, appended with caching guidelines from operation 256, wherein the caching guidelines are calculated to recommend that a segment is not cached by the Content Distribution Network beyond its expiration time. In one embodiment, the caching guidelines for a segment are expressed by setting the "Cache-Control: max-age" parameter in the HTTP header of the response. As an example, if a segment file was ingested at 6 pm with a time-to-live of 24 hours and such segment is requested at 9 am the following day, the caching guideline will set Cache-Control: max-age=32400, wherein 32400 is the number of seconds between 9 am and 6 pm.

In one embodiment, a list and description request is responded, if the requested streaming protocol is supported as determined in operation 261 and the requested interval include any segments that are not obsolete yet as determined in operation 263, with the requested interval list in operation 267 appended with caching guidelines (from operation 265), wherein the caching guidelines are calculated to recommend that the requested list is not cached by the Content Distribution Network either a) beyond the expiration time of the first segment of the list, if the interval starts and ends in the past, or b) beyond the duration of the last segment of the list, if the interval starts in the past and ends in the future. In one embodiment, the caching guidelines for a list and description are expressed by setting the "Cache-Control: max-age" parameter in the HTTP header of the response. As an example, if a live video stream is recorded with a time-to-live of 24 hours, and if a one hour interval between 6 pm and 7 pm is requested at 6:45 pm, the caching guideline will set Cache-Control: max-age=3, where 3 is the last segment duration rounded to the next integer. If the same interval is requested at 9 am the next day, the caching guideline will set Cache-Control: max-age=32400, wherein 32400 is the number of seconds left to live for the first segment of the interval.

In one embodiment, the caching guideline for a list and description request, whose interval starts in the past and ends in the future is set to the maximum of the duration of the last segment of the list and a multiple of the response time. Indeed, under peak demand, the LOD origin processing time for list and description requests for large intervals could be close to the segment duration, which means that the response could be discarded by the CDN before being consumed, and then the CDN would request it again. One aspect of the invention extends the caching guidelines, when the system is busy and slowing down, to avoid a possible avalanche effect.

Figure 3A:
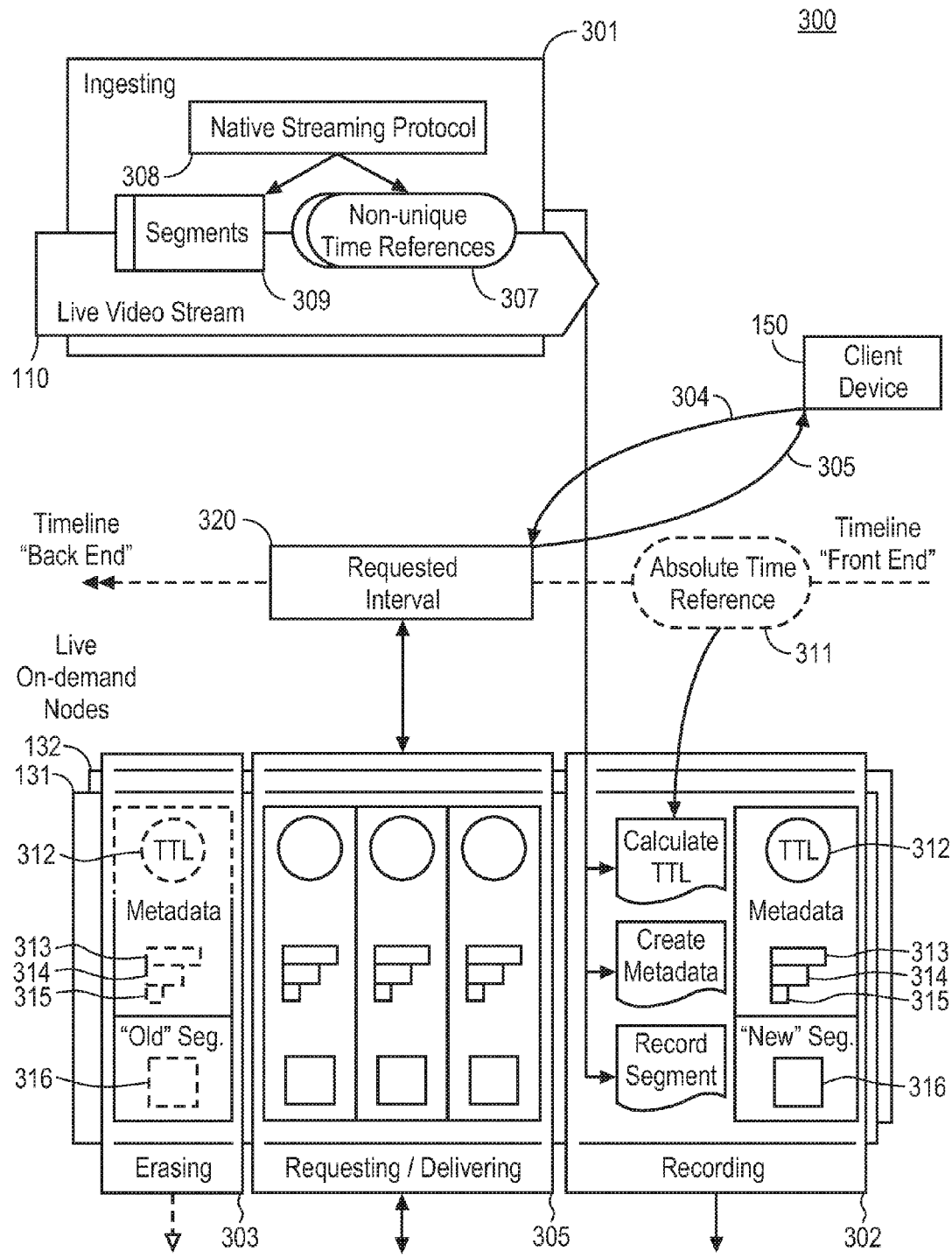
FIG. 3A shows a timeline diagram illustrating an exemplary embodiment for ingesting, recording, erasing and delivering upon request.

FIG. 3A 300 shows a timeline diagram illustrating an exemplary embodiment for ingesting 301 a live video stream 110, recording 302 and erasing 303 to and from one or both of live on demand nodes 131 and 132, and delivering 305 to client device 150 upon requesting 304.

In at least one embodiment, the ingesting 301 identifies a new segment file 309, described in a native streaming protocol 308, with a time reference $t_r$ 307 relative to the live video stream 110, wherein the relative time reference may rollover multiple times during the expecting recording time of the segment, which makes the time reference $t_r$ 307 not unique and therefore not a usable time index for the recording.

In one embodiment at the front end of the timeline, the recording 302 of new segment 309 includes associating an absolute time reference 311, calculating the time-to-live (TTL) 312, creating and recording multiple forms of metadata 313, 314 and 315 and recording the segment 316, as documented in FIG. 2A.

In one embodiment and at the back end of the timeline, the erasing 303 of an old segment and its associated forms of metadata is performed, as documented in FIG. 2A.

In at least one embodiment, the requesting 304 of an live video stream interval 320 or a segment 308, wherein the interval includes any possible section of the recorded timeline is processed, as documented in FIG. 2B.

Figure 4:
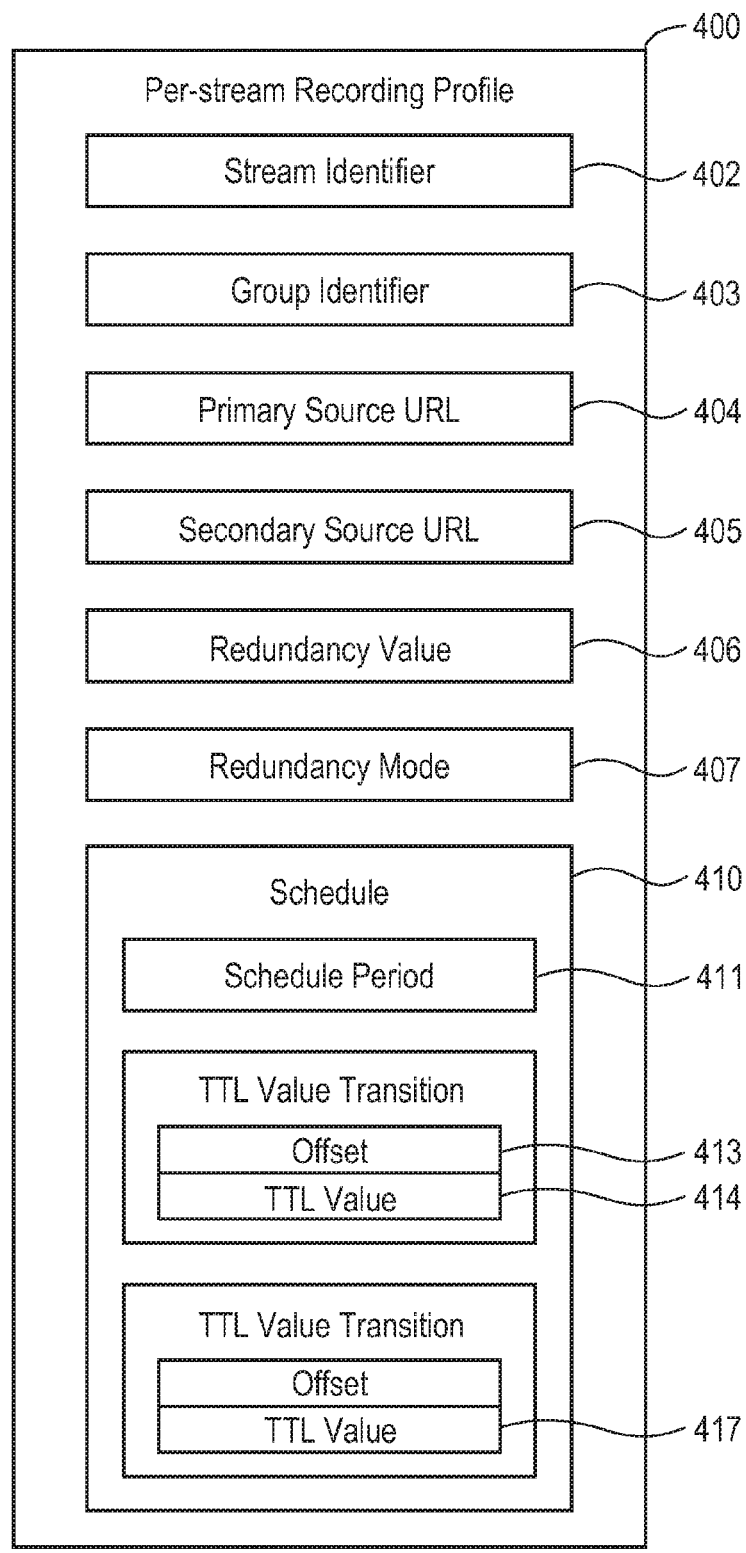
FIG. 4 shows an exemplary embodiment of a per-stream recording profile.
Figure 5A:
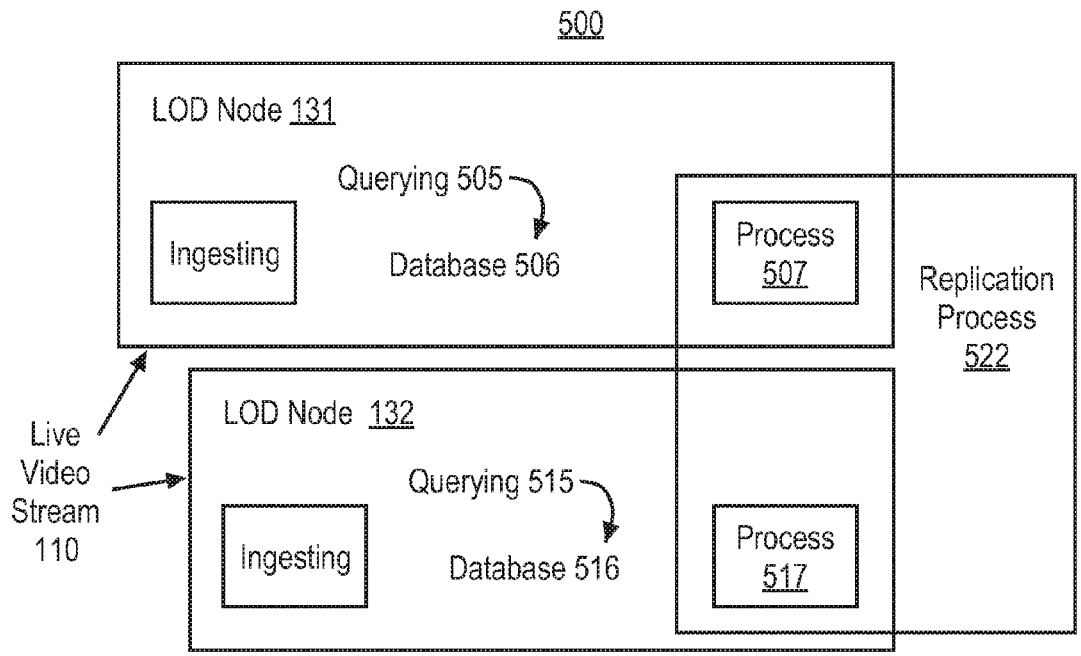
FIG. 5A shows a block diagram illustrating an exemplary embodiment for parallel ingesting.
Figure 5B:
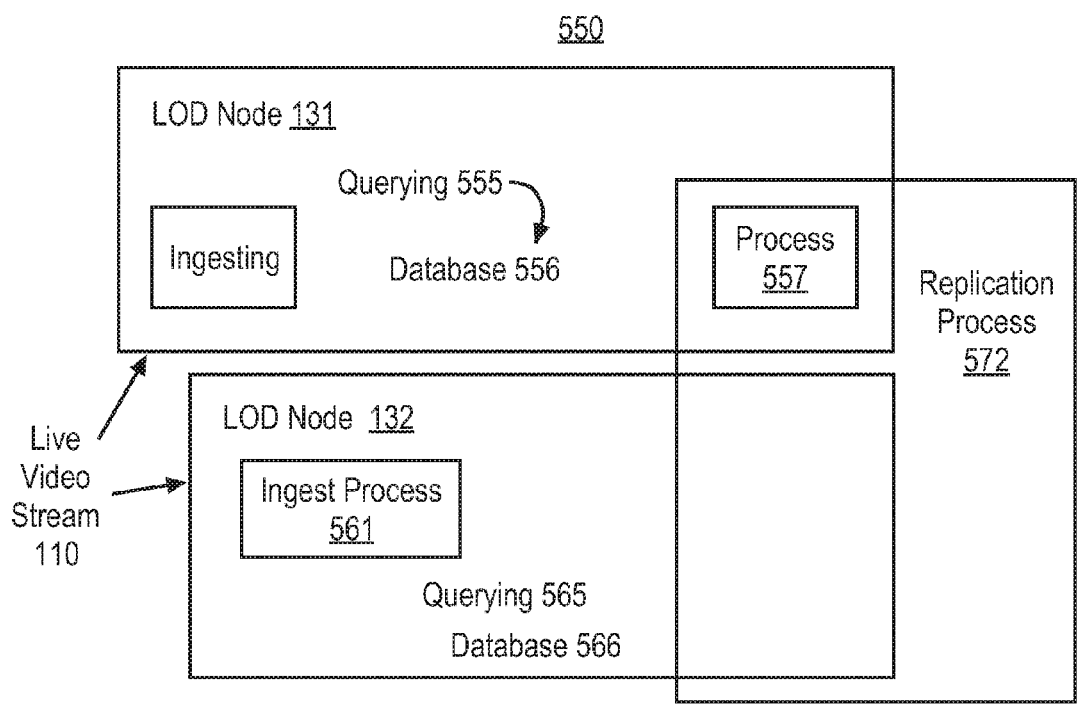
FIG. 5B shows a block diagram illustrating an exemplary embodiment for shadow ingesting.

In at least one embodiment, a per-stream recording profile 400, as described in FIG. 4 includes, but is not limited to: a) a stream identifier 402 and a group identifier 403, wherein the combination of the stream and group identifiers is unique across the system, b) a primary source URL 404 and a possible secondary source URL 405, wherein the primary and secondary source URLs defines the location of a list and description of the latest segment of a live video stream, and wherein the system is instructed to use the secondary source URL when the primary source URL is not available, c) a redundancy value 406 and redundancy mode 407 (wherein the redundancy value defines how many live on demand nodes are required for redundant ingesting of the live video stream, and the redundancy mode defines how these nodes are collaborating for the ingesting, as further illustrated in FIGS. 5A and 5B) and d) a recording schedule 410, wherein the schedule defines for an interval period (i.e. day, week) synchronized to Jan. 1, 1970, one or more offset 413 from the beginning of the period and time-to-live 414 value pairs. The values 414 and 417 can, in one embodiment, be time-to-live values. For example, a schedule with a schedule period 411 of a day, can be defined having a time-to-live value of 24 hours during primetime hours (e.g. 5:00 pm -11:00 pm) and a time-to-live value of 1 hour for the rest of the day. The per-stream recording profile 400 can also include, in one embodiment, a default time-to-live value, which can be used when no schedule is provided, as described herein to determine when segments in the stream become obsolete (and therefore can be deleted). Each stream can have its own time-to-live (TTL) value that is based on a schedule; for example, a TV show or other content that is transmitted and recorded live at 6:00 pm to 7:00 pm each day (during primetime) may have a longer TTL value (such as 24 hours) than the TTL value for a TV show or other content that airs at 2:00 am (or some other non-primetime hour). The allowed TTL values can depend upon the content distributor and/or the licensing rights from the content owners. If allowed, a content distributor may seek to have long TTL values, such as 7 days for primetime content (e.g., content normally presented during 5:00 pm to 11:00 pm) and 1 day for non-primetime content.

FIG. 5A 500 shows live on demand nodes 131 and 132 participating cooperatively in the parallel ingesting of live video stream 110, wherein node 131 is querying 505 database 506 to determine which segment from live video stream 110 are still to be recorded and wherein node 132 is querying 515 database 516 to do the same, and wherein the replication process 522 conjointly performed by process 507 for node 131 and process 517 for node 132 is keeping the databases 506 and 516 eventually consistent.

In at least some implementation, wherein the consistency could not be achieved instantaneously, the recording of a new segment is performed by both nodes using the database time reference to calculate the segment's absolute reference, and wherein the last node recording supersedes the first node recording.

In some other implementation, each of two live on demand nodes of equivalent performance statistically record 50% of the live video stream segments.

In some other implementation, each of "n" live on demand nodes of equivalent performance statistically record 100/n % of the live video stream segments.

FIG. 5B 550 shows live on demand nodes 131 and 132 participating cooperatively in the exclusive ingesting of live video stream 110, wherein node 131 is querying 555 database 556 to determine which segment from live video stream 110 are still to be recorded and wherein node 132 is querying 565 database 566 to monitor the progress of node 131 ingesting, and wherein the replication process 572 performed by process 557 for node 131 is keeping the database 556 eventually consistent with database 566.

In at least one embodiment, the ingesting process 561 of node 132 detects that node 131 has stopped ingesting by comparing the absolute time of the latest recorded segment replicated to database 566 to its current wall clock, and wherein upon detection of the interruption registers itself as the active node and downgrades node 131 to a monitoring state, and wherein the registering and the downgrading operation is part of the single atomic operation to database 566, which is eventually going to be replicated to database 556 of node 131, and wherein node 131, if it is still properly operating will stop actively ingesting and start monitoring.

In one embodiment, a monitoring node 132, which detects an interruption of the ingesting process by the active node, is required to wait for a random amount of time before re-registering itself, as the next active node. This operation minimizes the amount of instruction toggling upon live video stream outage, and allows the system to more quickly settle on a given active node, when multiple monitoring nodes are participating to the ingesting.

Figure 6:
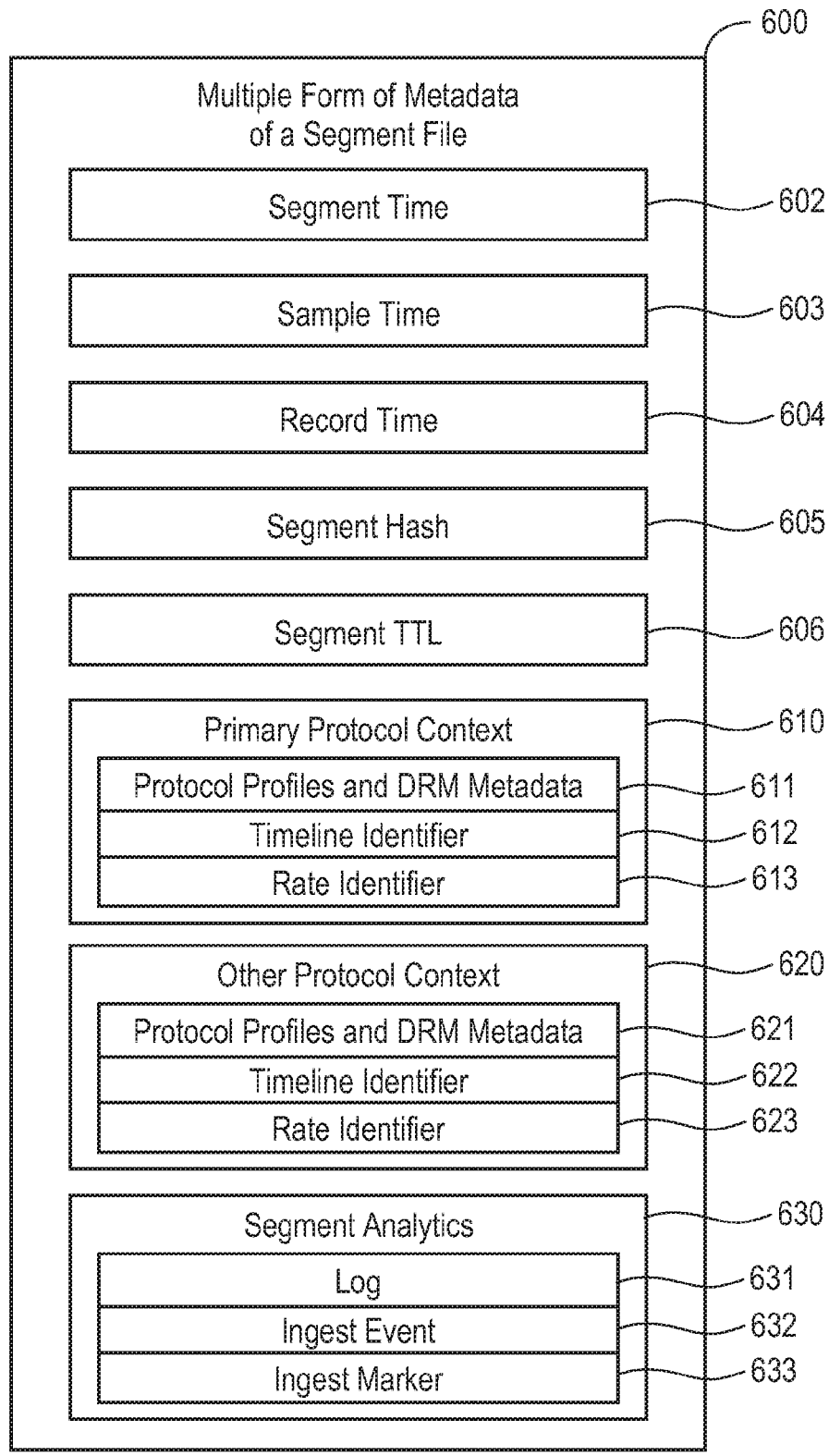
FIG. 6 shows an exemplary embodiment of a per-segment multiple form of metadata.

In at least one embodiment, the multiple forms of metadata 600 of a segment file, as described in FIG. 6 includes, but is not limited to: a) a segment time 602, a sample time 603 and a record time 604, wherein the segment time 602 is the absolute time of the segment as calculated in the timeline, the sample time 603 is the earliest segment time for all the segments that comprise a segment period (i.e. an HD channel with 4 video rates and 2 audio rates will have a total of 6 segments per segment period, and some of these segments may not have the same segment time), and the record time 604 is the wall clock time at which the segment has been actually recorded in the database, wherein the difference between the segment time and the wall clock time defines the actual ingest latency of the system, b) a segment hash 605 for fast identification of a live video stream discontinuity or changes of encoding, c) a segment TTL 606 that defines the desired lifecycle of the segment, d) a primary protocol context 610, which includes all the information required to generate a list and description of a live video stream interval starting on the segment in the native streaming protocol of the live video stream source, e) one or more other protocol context 620, which includes all the information required to generate a list and description of a live video stream interval starting on the segment in a different streaming protocol than the native streaming protocol of the live video stream source, f) one or more segment analytic recordings, wherein recordings are indexed with different values for generating multi-dimensional reports.

In one embodiment, the primary and the other protocol context parameters for describing the overall structure of the live video stream 611 and 621, include but is not limited to, protocol profiles and DRM metadata.

In one embodiment, the primary and the other protocol context parameters for describing the segment timeline 612 and 622, include but is not limited to, a timeline identifier, a content encoder profile and sampling rate and the segment duration.

In one embodiment, the primary and the other protocol context parameters for describing the segment rate 613 and 623, includes but is not limited to, a rate identifier, a content encoder profile, and a rate average bandwidth.

In one embodiment, the segment analytics recording 630 includes but is not limited to, a) a logging record 631 with original live video stream source data and performance, b) an ingest event 632, wherein an ingest event consists a change of the per-stream recording profile, a change of recording depth per recording schedule, or the detection of a discontinuity, c) an ingest marker 633, wherein an ingest marker consists of an in-band event inserted at the live video stream source to materialize a future or actual ad-insertion point, a programming event boundary, a encoding event change or an encryption key rotation, as potentially defined by an event marker specification such as but not limited to the format defined in the SCTE-35 specification.

Figure 7:
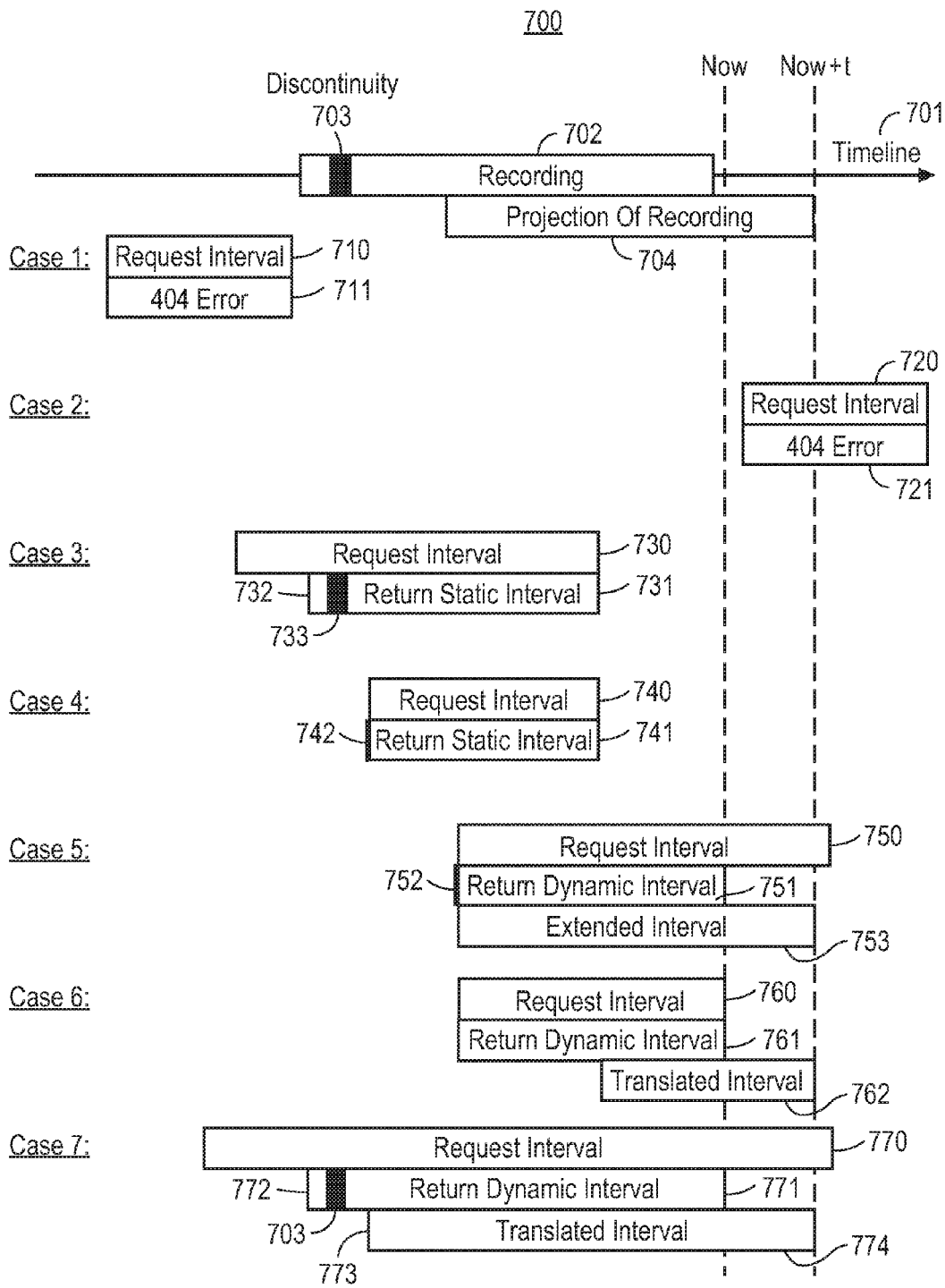
FIG. 7 shows multiple examples of a delivery of a segment list and description based on the time of the capturing, the start and duration of the interval, the time of the request and the presence of one ore more missing segments.

FIG. 7 700 shows a timeline 701 with a representation of the current recording 702 of a live video stream with a discontinuity 703, and a projection of this recording as it may be requested for playback 704 in t minutes from now, and multiple exemplary embodiments of the delivering of lists and descriptions of a live on demand video stream interval upon a playback request.

In one embodiment (case 1), a request 710 for an interval past the recording 702 is returned with a HTTP 404—NOT FOUND error 711.

In another embodiment (case 2), a request 720 for in interval ahead (in the future) of the recording 702 is also returned with a HTTP 404—NOT FOUND error 721.

In another embodiment (case 3), a request 730 for an interval that starts past the recording 702, ends anywhere in the recording 702, and spans a content discontinuity 703, is returned a static interval 731, which starts with an anchor point 732 pointing to first record of the recoding 702 and ends with the last record of 702 before the end time of the requested interval, and a representation 733 of the discontinuity 703, wherein the interval is static because the end point is not evolving over time.

In another embodiment (case 4), a request 740 for an interval included in the recording 702, is returned as a static interval 741, which starts with an anchor point 742 pointing to the first record of 702 past the beginning of the requested interval and ends with the last record of 702 before the end time of the requested interval, wherein the interval is static because the end point is not evolving over time.

In another embodiment (case 5), a request 750 for an interval that starts in the recording 702, and ends anywhere in the future, is returned a dynamic interval 751, which starts with an anchor point 752 pointing to the first record of 702 past the beginning of the requested interval and ends with the last record of 702, wherein the interval is dynamic (until the requested interval 750 has elapsed) because another request for the same interval at instant now+t returns an extended interval 753 wherein the end point has shifted.

In another embodiment (case 6), a request 760 for an interval that starts in the recording 702, and does not specify any end point, is returned as a dynamic interval 761, which starts with the first record of 702 past the beginning of the requested interval and ends with the last record of 702, wherein the interval is dynamic because another request for the same interval at instant now+t returns a translated interval 762 wherein both the start point and the end point have shifted.

In another embodiment (case 7), a request 770 for an interval that spans from prior to the start of the recording 702 and ends in the future, is returned a dynamic interval 771 with a representation 773 of the recoding discontinuity 703, which starts with an anchor point 772 that points to the first record of 702 and ends with the last record of 702, and wherein the interval is dynamic because another request for the same interval at instant now+t returns a translated interval 774 wherein both the anchor point 773 and the end point have shifted.

Figure 8:
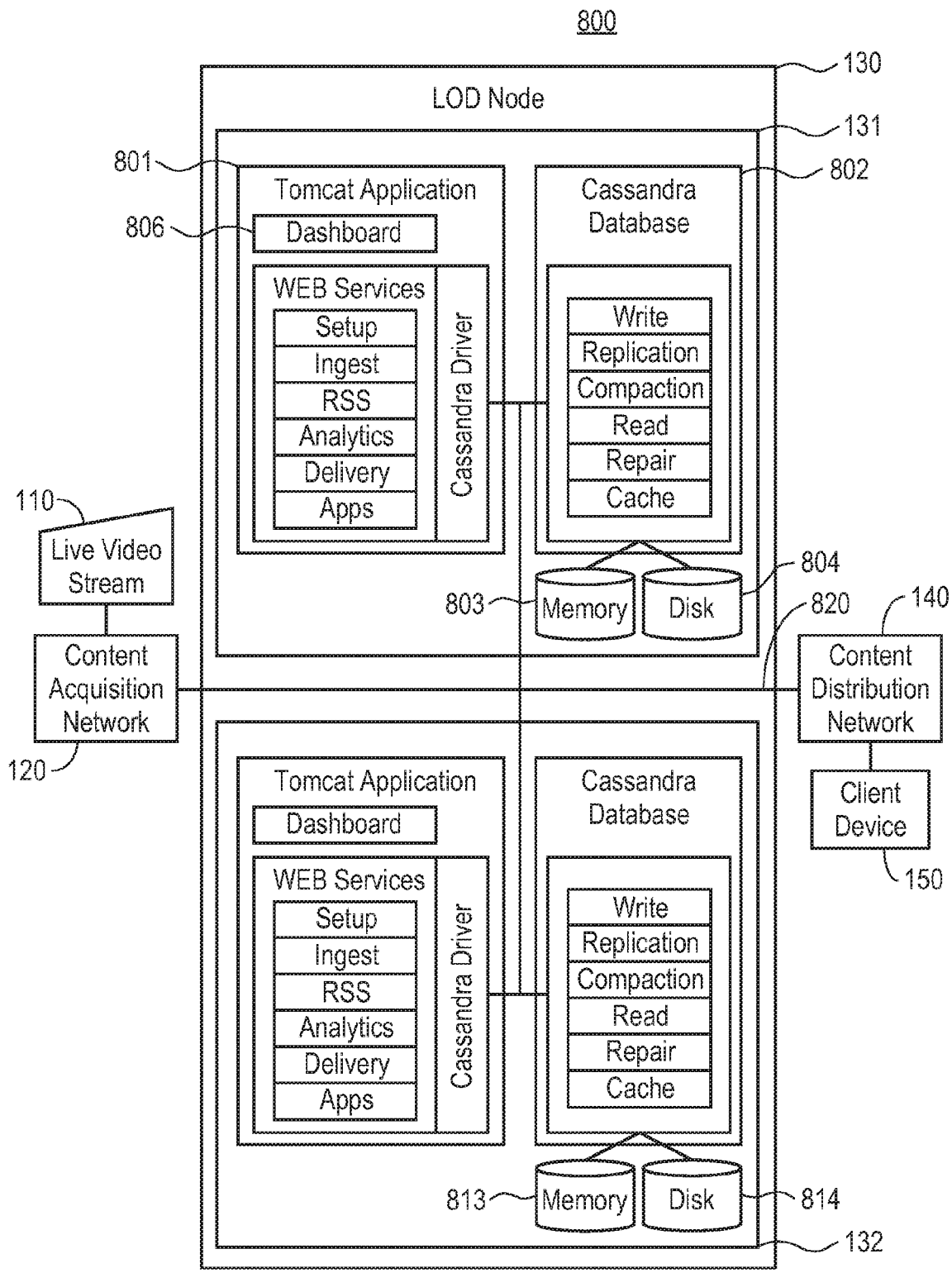
FIG. 8 shows an exemplary embodiment of the invention using, for example, a Tomcat application and a Cassandra non-relational database.

FIG. 8 800 shows a exemplary embodiment of a live-on-demand node 130, ingesting one or more live video streams 110 through a content acquisition network 120, and delivering intervals of live video streams to one or more client devices 150 upon request through a content distribution network 140.

In at least one embodiment, a LOD node consists of a number of live on demand nodes 131 and 132 distributed in one or more racks (not represented) in one or more datacenters (not represented), wherein each LOD node 131, 132 has access through network 820 to any LOD node.

In one embodiment, a LOD node 131 includes, but is not limited to, a Tomcat application 801 and a Cassandra database 802, wherein the Tomcat application is responsible for managing web services to configure, control and operate the LOD node, and wherein the Cassandra database is an open source non-relational database managed by the Apache organization responsible for recording the segment files and their multiple forms of metadata. It will be understood that the Cassandra database is one example of a database that can be used to store the segment files and their metadata and that other databases can be used in other embodiments. Similarly, the Tomcat application is one example of a web services management system and that other web services management systems can be used in other embodiments.

In one embodiment, the web services include, but are not limited to: a) a setup service to retrieve the current configuration file, b) an ingest service to register per-stream recording profiles, fetch all live video stream segments, balance the ingest tasks across all live on demand nodes and calibrate the erasing based on the overall ingest activity, c) an RSS service to publish the current ingest and recording state of the live on demand origin, d) an analytics service to retrieve and aggregate the various forms of analytics metadata, e) a delivery service to process requests from one or more client devices 150, and f) an apps service to facilitate the discovery of the recorded content by the downstream applications.

In one embodiment, the Tomcat application is hosting a dashboard application 806 to exercise and render the web services for the purpose of enabling user control and observation of the system.

In one embodiment, the Tomcat application is interacting with the Cassandra database of one or more live on demand nodes 131, 132 through a Cassandra driver.

In one embodiment, the Cassandra database 802 is using the local ephemeral (memory 803 such as DRAM) and permanent (disk 804 such as flash memory) storage apparatus of the live on demand node to respectively write the memory and disk tables, wherein the Cassandra database is responsible for replicating, compacting, repairing, caching and reading content. In one embodiment, the video segments and their multiple forms of metadata are recorded in one or more tables of the Cassandra database. In one embodiment, the LOD nodes are part of a distributed network of virtualized storage devices.

FIG. 9 shows one example of a data processing system, which may be used as any one of the LOD nodes in any one of the embodiments described herein. Note that while FIG. 9 illustrates various components of a data processing system, it is not intended to represent any particular architecture or manner of interconnecting the components as such details are not germane to this description. It will also be appreciated that other data processing systems which have fewer components or perhaps more components than those shown in FIG. 9 may also be used with one or more embodiments described herein.

As shown in FIG. 9, the system 900, which is a form of a data processing system, includes one or more buses 903 which is coupled to one or more microprocessor(s) 906 and a ROM (Read Only Memory) 907 and volatile RAM 905 and a non-volatile memory 911. The one or more processors can be coupled to optional cache 904. The one or more microprocessors 906 may retrieve the stored instructions from one or more of the memories 907, 905 and 911 and execute the instructions to perform operations described above. These memories represent examples of machine readable non-transitory storage media that can store or contain computer program instructions which when executed cause a data processing system to perform the one or more methods described herein thereby causing the system 900 to operate like any one of the LOD nodes described herein. The bus 903 interconnects these various components together and also interconnects these components 906, 907, 905 and 911 to an optional display controller and display device 913 and to optional peripheral devices such as input/output (I/O) devices 915 which may be one or more of mice, touch screens, touch pads, touch sensitive input devices, keyboards, modems, network interfaces, printers and other devices which are well known in the art. Typically, the input/output devices 915 are coupled to the system through input/output controllers 917. The volatile RAM (Random Access Memory) 905 is typically implemented as dynamic RAM (DRAM), which requires power continually in order to refresh or maintain the data in the memory. The volatile RAM 905 can be used to implement the memory 803 of node 130 in FIG. 8 or the memory 813 of node 131 in FIG. 8.

The mass storage 911 is typically a magnetic hard drive or a flash memory or other types of memory system (or a combination of systems) which maintain data (e.g., large amounts of data) even after power is removed from the system. Typically the mass storage 911 will also be a random access memory although this is not required. The mass storage 911 can be used to implement the disk 804 of node 130 or the disk 814 of node 131. The mass storage 911 can thus be used to store the playlists and the segment files and their metadata. While FIG. 9 shows that the mass storage 911 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method for continuously ingesting, recording and erasing multiple live video streams on a cluster of interconnected, autonomous live on demand nodes and delivering upon request any interval of the recordings, the method comprising:
ingesting the live video streams in a distributed manner on any one or more nodes of the cluster of interconnected, autonomous live on demand nodes from at least one source through a content acquisition network, the ingesting of the multiple live video streams being from multiple sources, each live video stream being ingested while the source of that live video stream is still receiving video content and wherein each live video stream is divided into multiple segment files, each segment file representing a unique format and bit rate of the live video stream for a fraction of the duration of a finite event in that live video stream, and each video stream has, while being received, an indefinite, unknown end time and an indefinite, unknown total length from start time to end time;

recording each of the live video streams on plurality of nodes of the cluster of interconnected, autonomous live on demand nodes, divided in multiple segment files, wherein each segment file is concurrently replicated on one or more live on demand nodes and is assigned a time-to-live value based on a per-stream recording profile and wherein each segment file is associated with multiple forms of metadata and wherein the segment files for each of the live video streams are recorded in a distributed manner across all of the nodes in the cluster of interconnected, autonomous live on demand nodes;

erasing, by each node, each instance of the recorded segment files on each node of the cluster of interconnected, autonomous live on demand nodes once they are older than their time-to-live value, wherein the erasing is scheduled to minimize disk and performance overheads based on the average segment file, wherein each segment file represents a unique format and bit rate of the live video stream for a fraction of a finite event in that live video stream;

upon an on demand request on any one or more nodes of the cluster of interconnected, autonomous live on demand nodes from one or more client devices, delivering through a content distribution network, to the one or more client devices either a) a list and description of all the segment files comprising a random interval of one of the recorded video streams, the list and description being constructed upon demand from the metadata of each segment file that composes the interval, wherein each segment file represents a unique format and bit rate of the live video stream for a fraction of a finite event in that live video stream or b) the segment files referenced in the transmitted list, wherein each segment file represents a unique format and bit rate of the live video stream for a fraction of a finite event in that live video stream, wherein the recorded video stream interval descriptions and segment files can be retrieved by the one or more client devices independently of when and where the recorded video stream segment files have been recorded, and wherein caching guidelines are dynamically created and appended to the response based on the time of the request, the time of the interval and the time-to-live of the segment file.

2. The method of claim 1 wherein the per-stream recording profile includes a stream identifier to be used for delivery requests, one or more source locators, a redundancy value, a redundancy mode and a recording time-to-live schedule, which defines based upon a set time period one or more time-to-live value transitions for the recording of that stream.

3. The method of claim 1 wherein the ingesting of each live video stream is performed by one or more participating nodes, the number of participating nodes being based on a redundancy value as defined in a per-stream recording profile.

4. The method of claim 3 wherein all the participating nodes are actively acquiring the segment files concurrently, and the method further comprising:
reading one or more forms of metadata to synchronize ingesting across all the participating nodes, wherein the metadata includes but is not limited to a calculated time reference and a measured duration for the last recorded segment files.

5. The method of claim 3 wherein one participating node is actively acquiring the segment files, while other participating nodes are monitoring the accumulation of one or more forms of metadata and wherein the method for the monitoring node further comprising:
detecting an interruption of the ingesting when no metadata has been recorded for longer than a predefined time period;
registering itself as the next active node after a random interval of time;
requesting the current active node to start monitoring, wherein the registering and the requesting are combined in a single atomic operation.

6. The method of claim 3 wherein the ingesting node records for each segment file multiple forms of metadata, prior to recording the file itself, the method further comprising:
recording with one or more searchable indexes, an absolute segment context, based on the segment description of the sourced live video stream packaging protocol, to support the transmitting upon request of a random interval starting from the segment in the same streaming protocol;
recording with one or more searchable indexes, one or more alternative segment contexts, based on the segment description of the sourced live video stream packaging protocol, to support the transmitting upon request of a random interval starting from the segment in one or more alternate streaming protocols;
recording with one or more searchable indexes multiple forms of performance details to support multi dimensional analytics queries.

7. The method of claim 1 wherein the erasing comprises calculating and providing compaction parameters to a compaction process, and wherein the calculation is a function of one or more average ingest rate, one or more average time-to-live values and the targeted disk overhead.

8. The method of claim 7 wherein the erasing is reconfigured when new recorded live video streams are added or removed, when recording time-to-live values change in each stream schedule, or when changes in the Content Acquisition Network modify the structure of each ingested live video stream.

9. The method of claim 7 wherein the erasing is sequenced by grouping all the live stream recordings into one or more groups, and by providing each group with a different variation of at least one of the nominal parameter values.

10. The method of claim 7 wherein the erasing is further optimized by calculating and providing different parameter values per categories of video streams that share similar recording profiles, wherein the calculation is using a different average ingest rate and a different average time-to-live value per category.

11. The method of claim 1 wherein the on demand request can occur at any time after the start of the recording of the live video streams but prior to erasing the live video stream segment files.

12. The method of claim 1 wherein the list and description of the segment files for a random interval of one of the live video streams depends on the requested streaming protocol, the time of ingesting, the start and duration of the interval, the time of the request, a detection of missing segment files and a presence of singular segments.

13. The method of claim 11 wherein a segment is singular because it has been associated in the sourced live video streaming protocol with an in-band event, including but not limited to events identified according to a SCTE 35 protocol.

14. The method of claim 11 wherein the caching guidelines for downstream content delivery networks are calculated based on one or more of the requested streaming protocol, the start and duration of the interval, the time of the request, the segment duration, the remaining time-to-live of the segment files and the overall response time.

15. The method of claim 1 wherein the segments and their multiple forms of metadata are recorded in one or more tables of a distributed non-relational database.

16. The method of claim 1 wherein the ingesting is performed on one or more ingesting nodes different than the live on demand nodes.

17. The method of claim 1 wherein the on-demand request delivering is performed on one or more delivery nodes different than the live on demand nodes.

18. A cluster of interconnected data processing systems, which act as nodes to perform the method of claim 1.

19. The method of claim 1 wherein one of the multiple sources is one of the LOD nodes, wherein the live video stream corresponds to a previously recorded interval, and wherein the per stream recorded profile creates a new copy of the interval with extended time-to-live value.

20. One or more non-transitory machine readable media storing executable program instructions that, when executed by one or more data processing systems, cause the one or more data processing systems to perform a method for continuously ingesting, recording and erasing multiple live video streams on a cluster of interconnected, autonomous live on demand nodes and delivering upon request any interval of the recordings, the method comprising:
  ingesting the live video streams in a distributed manner on any one or more nodes of the cluster of interconnected, autonomous live on demand nodes from at least one source through a content acquisition network, the ingesting of the multiple live video streams being from multiple sources, each live video stream being ingested while the source of that live video stream is still receiving video content and wherein each live video stream is divided into multiple segment files, each segment file representing a unique format and bit rate of the live video stream for a fraction of the duration of a finite event in that live video stream, and each video stream has, while being received, an indefinite, unknown end time and an indefinite, unknown total length from start time to end time;
  recording each of the live video streams on plurality of nodes of the cluster of interconnected, autonomous live on demand nodes, divided in multiple segment files, wherein each segment file is concurrently replicated on one or more live on demand nodes and is assigned a time-to-live value based on a per-stream recording profile and wherein each segment file is associated with multiple forms of metadata and wherein the segment files for each of the live video streams are recorded in a distributed manner across all of the nodes in the cluster of interconnected, autonomous live on demand nodes;
  erasing, by each node, each instance of the recorded segment files on each node of the cluster of interconnected, autonomous live on demand nodes once they are older than their time-to-live value, wherein the erasing is scheduled to minimize disk and performance overheads based on the average segment file, wherein each segment file represents a unique format and bit rate of the live video stream for a fraction of a finite event in that live video stream;
  upon an on demand request on any one or more nodes of the cluster of interconnected, autonomous live on demand nodes from one or more client devices, delivering through a content distribution network, to the one or more client devices either a) a list and description of all the segment files comprising a random interval of one of the recorded video streams, the list and description being constructed upon demand from the metadata of each segment file that composes the interval, wherein each segment file represents a unique format and bit rate of the live video stream for a fraction of a finite event in that live video stream or b) the segment files referenced in the transmitted list, wherein each segment file represents a unique format and bit rate of the live video stream for a fraction of a finite event in that live video stream, wherein the recorded video stream interval descriptions and segment files can be retrieved by the one or more client devices independently of when and where the recorded video stream segment files have been recorded, and wherein caching guidelines are dynamically created and appended to the response based on the time of the request, the time of the interval and the time-to-live of the segment file.

21. The one or more media of claim 20 wherein the per-stream recording profile includes a stream identifier to be used for delivery requests, one or more source locators, a redundancy value, a redundancy mode and a recording time-to-live schedule, which defines based upon a set time period one or more time-to-live value transitions for the recording of that stream.

22. The one or more media of claim 20 wherein the ingesting of each live video stream is performed by one or more participating nodes, the number of participating nodes being based on a redundancy value as defined in a per-stream recording profile.

23. The one or more media of claim 22 wherein all the participating nodes are actively acquiring the segment files concurrently, and the method further comprising:
  reading one or more forms of metadata to synchronize ingesting across all the participating nodes, wherein the metadata includes but is not limited to a calculated time reference and a measured duration for the last recorded segment files.

24. The one or more media of claim 22 wherein one participating node is actively acquiring the segment files, while other participating nodes are monitoring the accumulation of one or more forms of metadata and wherein the method for the monitoring node further comprising:
  detecting an interruption of the ingesting when no metadata has been recorded for longer than a predefined time period;
  registering itself as the next active node after a random interval of time;
  requesting the current active node to start monitoring, wherein the registering and the requesting are combined in a single atomic operation.

25. The one or more media of claim 22 wherein the ingesting node records for each segment file multiple forms of metadata, prior to recording the file itself, the method further comprising:

recording with one or more searchable indexes, an absolute segment context, based on the segment description of the sourced live video stream packaging protocol, to support the transmitting upon request of a random interval starting from the segment in the same streaming protocol;

recording with one or more searchable indexes, one or more alternative segment contexts, based on the segment description of the sourced live video stream packaging protocol, to support the transmitting upon request of a random interval starting from the segment in one or more alternate streaming protocols;

recording with one or more searchable indexes multiple forms of performance details to support multi-dimensional analytics queries.

26. The one or more media of claim 20 wherein the erasing is a two-step process, the method further comprising:

obsoleting segment files immediately upon expiration across all nodes;

configuring each node dynamically to progressively and independently erase all the obsolete segment files based on current ingesting activity and the recording schedule of each live video streams.

27. The one or more media of claim 26 wherein the erasing is optimized per group of live video stream sharing the same recording schedule.

28. The one or more media of claim 20 wherein the on demand request can occur at any time after the start of the recording of the live video streams but prior to erasing the live video stream segment files.

29. The one or more media of claim 20 wherein the list and description of the segment files for a random interval of one of the live video streams depends on the requested streaming protocol, the time of ingesting, the start and duration of the interval, the time of the request, a detection of missing segment files and a presence of singular segments.

30. The one or more media of claim 28 wherein a segment is singular because it has been associated in the sourced live video streaming protocol with an in-band event, including but not limited to events identified according to a SCTE 35 protocol.

31. The one or more media of claim 28 wherein the caching guidelines for downstream content delivery networks are calculated based on the requested streaming protocol, the start and duration of the interval, the time of the request, the remaining time-to-live of the segment files and the overall response time.

32. The one or more media of claim 20 wherein the segments and their multiple forms of metadata are recorded in one or more tables of a distributed non-relational database.

33. A cluster of autonomous live on demand nodes, each of which has a non-transitory machine readable storage medium that is one of the one or more media of claim 20.

* * * * *